(12) United States Patent
Sweeney

(10) Patent No.: US 12,539,189 B2
(45) Date of Patent: Feb. 3, 2026

(54) MEDICAL INSTRUMENT AND RETAINER FOR POSITIONING THE MEDICAL INSTRUMENT FOR STERILIZATION

(71) Applicant: Cygnus Medical, LLC, Branford, CT (US)

(72) Inventor: Shaun Sweeney, Wayne, NJ (US)

(73) Assignee: Cygnus Medical, LLC, Branford, CT (US)

( * ) Notice: Subject to any disclaimer, the term of this patent is extended or adjusted under 35 U.S.C. 154(b) by 615 days.

(21) Appl. No.: 17/963,617

(22) Filed: Oct. 11, 2022

(65) Prior Publication Data

US 2023/0114891 A1  Apr. 13, 2023

Related U.S. Application Data

(60) Provisional application No. 63/254,359, filed on Oct. 11, 2021.

(51) Int. Cl.
*A61B 50/30* (2016.01)
*A61L 2/07* (2006.01)

(52) U.S. Cl.
CPC .............. *A61B 50/30* (2016.02); *A61L 2/07* (2013.01); *A61B 2050/3015* (2016.02); *A61B 2050/314* (2016.02)

(58) Field of Classification Search
None
See application file for complete search history.

(56) References Cited

U.S. PATENT DOCUMENTS

| 2012/0152289 | A1* | 6/2012 | Smith | A61L 2/26 |
| | | | | 134/109 |
| 2021/0386499 | A1* | 12/2021 | Bailey | A61B 50/33 |
| 2022/0331041 | A1* | 10/2022 | McVaney | B65H 75/36 |

FOREIGN PATENT DOCUMENTS

WO   WO-2021050768 A1 *  3/2021  .............. F16L 3/223

* cited by examiner

*Primary Examiner* — Jelitza M Perez
(74) *Attorney, Agent, or Firm* — St. Onge Steward Johnston & Reens LLC; Stephen P. McNamara

(57) ABSTRACT

A retainer device for positioning of medical instruments for cleaning and sterilization, including an elongated body portion with a first end and a second end, and a first end section positioned at the first end and a second end section positioned at the second end. Each of the first end section and the second end section includes a central opening and a gap connected to the central opening. Preferably, the end sections form a ring-like structure having a circular shape with the central opening and gap therein. The gap and the central opening are configured to receive a portion of a surgical instrument.

18 Claims, 7 Drawing Sheets

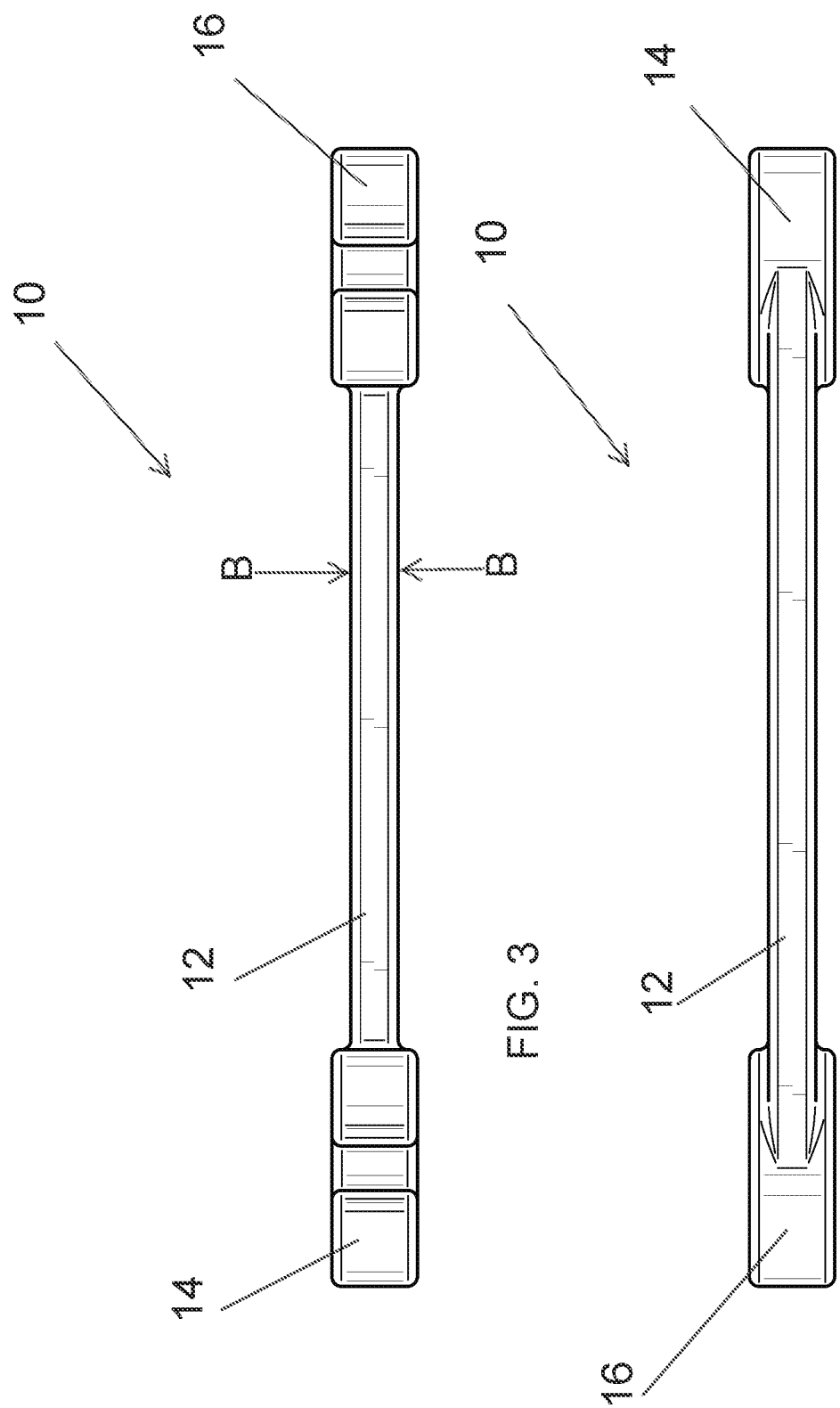

MEDICAL INSTRUMENT AND RETAINER FOR POSITIONING THE MEDICAL INSTRUMENT FOR STERILIZATION

FIELD OF THE INVENTION

The invention relates to the field of medical devices, and in particular, the sterilization of surgical instruments. Specifically, the invention relates to a methods of securing surgical instruments in an opened position within a sterilization container, a retainer for securing surgical instruments in an opened position within a sterilization container, and a sterile package containing a sterilized surgical instrument.

BACKGROUND OF THE INVENTION

Surgical instruments are commonly available as single-use, disposable instruments or multiple-use, reusable instruments. In many cases, a single-use, disposable instrument is more cost-effective and sanitary than a multiple-use, reusable instrument. However, some categories of instruments, particularly surgical scissors and heavy cutting instruments, are more cost-effective, and more effective tools for the surgeon, when constructed as a reusable instrument.

A safety concern with any reusable instrument is sterility, and the need to prevent cross-contamination between patients. Each surgical operation leaves biological residue from the patient's body on the surgical instruments. Medical professionals at hospitals and other surgical facilities have long been aware of the risk that small fragments of tissue from a prior case may remain on a grasping platform or cutting blades and have developed protocols to remove biological residue and then to sterilize the surgical instruments.

Notably, it is very important that every surface of a surgical instrument be cleaned to remove biological residues, and then sterilized after the biological residues are removed. Cleaning surgical instruments after a procedure requires specialized equipment and techniques. Common medical washing systems use hot water and surfactants formulated for removal of biological materials. The most common medical sterilization system is a steam sterilizer, also known as an autoclave, which uses saturated steam at 121-132° C. for a typical time period of 30 minutes under a pressure of 1 atm once all surfaces have reached a temperature of 121° C. Another common system is a vaporized hydrogen peroxide system.

Although traditionally instruments would be sterilized in a steam sterilizer and then packaged as needed until use, the current preferred packaging is a "peel pouch," also called a "peel pack." A peel pouch is a disposable sterilization package which has at least one gas permeable wall (such as medical grade paper, or Tyvek®) and one transparent wall (e.g. a clear plastic film) and which receives the cleaned instrument, is then sealed, and then sent to the steam sterilizer or other system. The steam or other sterilizing agent permeates the peel pouch and the instrument is sterilized. The instrument then remains in and is stored in the sterile peel pouch until needed for use, whereupon the sterile peel pouch may be opened by an operating room nurse and the sterile instrument provided to the surgeon for use. The peel pouch has become popular as it provides a greater assurance that the instrument has not become contaminated during handling and storage.

An AST medical sterilization standard requires that hinged instruments and instruments with ratchets should be held in an open position during cleaning and sterilization to allow the cleaning solutions and sterilizing agents to reach all bladed edges, serrations, ratchets and joints on such instruments.

There are a number of known devices, such as racks, stringers and clamps, designed to be used to hold an instrument in an open or unlatched position during cleaning and sterilization. For example, some sterilization systems use stainless steel instrument stringers, such as sold by Key Surgical, which are I-shaped bars or U-shaped rings which have parallel spaced apart rods that are threaded through the ring handles of surgical scissors to retain the scissors in an open position. Other systems use metal instrument racks that have upwardly extending I-shaped bars onto which the handles of the surgical instruments are inserted to keep the instruments in an opened position. Band clamps, such as sold by Healthmark Industries under ProSys™ brand, are made with stainless steel and are inserted through the loops and rings of the instrument handle to keep the instrument open.

The known holding devices, however, suffer from a number of drawbacks. The conventional devices are typically designed to hold multiple surgical instruments at once. This may have a negative effect on sterilization efficacy as instrument surfaces are touching during sterilization and may not be properly exposed to cleaning agents and sterilants.

More significantly, the commonly used racks and stringers are not compatible with single use sterilization peel pouches. It is not possible to have parallel spaced apart rods that are threaded through the ring handles of surgical scissors to retain the scissors in an open position if each set of scissors is sealed in a peel pouch. In the absence of some type of holding device however, there is the risk that the blades of scissors or other instrument parts may shift to a closed position, either due to gravity, or pressure from container sidewalls when the peel pouches are loaded in a steam sterilizer, or pressure of an adjacent peel pouch containing another instrument, or due to pressure from manual or automated handling of the peel pouch during sterilization.

Furthermore, the conventional devices are typically made with stainless steel and can be bulky and rather expensive. They also require cleaning and sterilization after each use, thus adding an extra step to the process. Conventional clamps can be cumbersome to insert into the instruments and add weight to sterilization peel pouches making it harder to keep the pouches in correct position before, during and after sterilization.

Also, in some cases, known holding devices are not useful if the cleaning and/or sterilization method involves use of a liquid bath and the bath size is not compatible with the holding devices.

There exists a need in the medical field for a retainer device for securing surgical instruments in an opened position within a sterilization container that is light and easy to handle and operate. There further exists a need for a retainer device that is inexpensive and disposable, and can be used with various sterilization systems including peel pouches.

SUMMARY OF THE INVENTION

To solve the problems of the conventional sterilization devices and to achieve the above-stated objectives, the present invention provides a retainer device for securing surgical instruments in an opened position within a sterilization container including an elongated body portion with a first end and a second end, and a first end section positioned at the first end and a second end section positioned at the second end. Each of the first end section and the second end section include a central opening such that the end sections have a generally ring-like structure. Each ring-like structure of the first and second end sections has a gap therein. The gap and the central opening are configured to receive and retain a portion of a surgical instrument.

In some embodiments, the retainer device is made with material which is opaque to X-rays.

In certain embodiments, the elongated body has a length of about 1 inch to 3.5 inches. In some preferred embodiments, the elongated body has a length of about 1.9 inches. In additional preferred embodiments, the elongated body has a length of about 2.7 inches.

In some cases, the gap has a tapered shape that tapers from an outer surface to an inner surface of the first and second end sections.

In some embodiments, the retainer device is made of polyurethane material.

In certain embodiments, the elongated body with the first end section and the second end section are made as a unitary piece.

To further solve the problems of the conventional sterilization devices and to achieve the above-stated objectives, the present invention provides a method of sterilizing a surgical instrument, including the steps of: placing the surgical instrument in an open position and positioning the surgical instrument in a retainer device to secure the instrument in the open position, The retainer device includes an elongated body portion with a first end and a second end, and a first end section positioned at the first end and a second end section positioned at the second end, wherein each of the first end section and the second end section has a central opening and a gap connected to the central opening. The step of positioning the surgical instrument in the retainer device includes inserting a first portion of the instrument into the gap and thereby into the central opening of the first end section and inserting a second portion of the instrument into the gap and thereby into the central opening of the second end section. The method further includes placing the surgical instrument with the retainer device in a sterilization container and performing a sterilization process.

In some embodiments, the sterilization container is a sterilization peel pouch.

In certain embodiments, the retainer device is discarded after the sterilization process.

In some embodiments, the surgical instrument is a ratcheted surgical instrument. In additional embodiments, the surgical instrument is a hinged surgical instrument.

In some cases, the gap of the first end section has a width that is substantially the same as an outer diameter of the first portion of the instrument, and the gap of the second end section has a width that is substantially the same as an outer diameter of the second portion of the instrument.

In certain embodiments, the gap of the first end section has a width that is smaller than an outer diameter of the first portion of the instrument, and the gap of the second end section has a width that is smaller than an outer diameter of the second portion of the instrument. In some of these embodiments, the first and second portions of the instrument are press fit through the gaps of the first end section and the second end section such that the instrument is securely retained in the retainer device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

FIG. 3 is a front view of the retainer device of FIG. 1.

FIG. 4 is a back view of the retainer device of FIG. 1.

DETAILED DESCRIPTION OF THE INVENTION

The embodiments of the present invention will be described with reference to the accompanying drawings and below description.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating sizes, amounts, ratios of materials, physical properties of materials, and/or use are to be understood as modified by the word "about," except as otherwise explicitly indicated.

The AST Standards of Practice for the Decontamination of Surgical Instruments state that hinged instruments and instruments with ratchets should be in the open position during cleaning and sterilization process. The retainer device of the present invention provides an easy and efficient way for securing surgical instruments in an opened position during sterilization.

Figure 1:
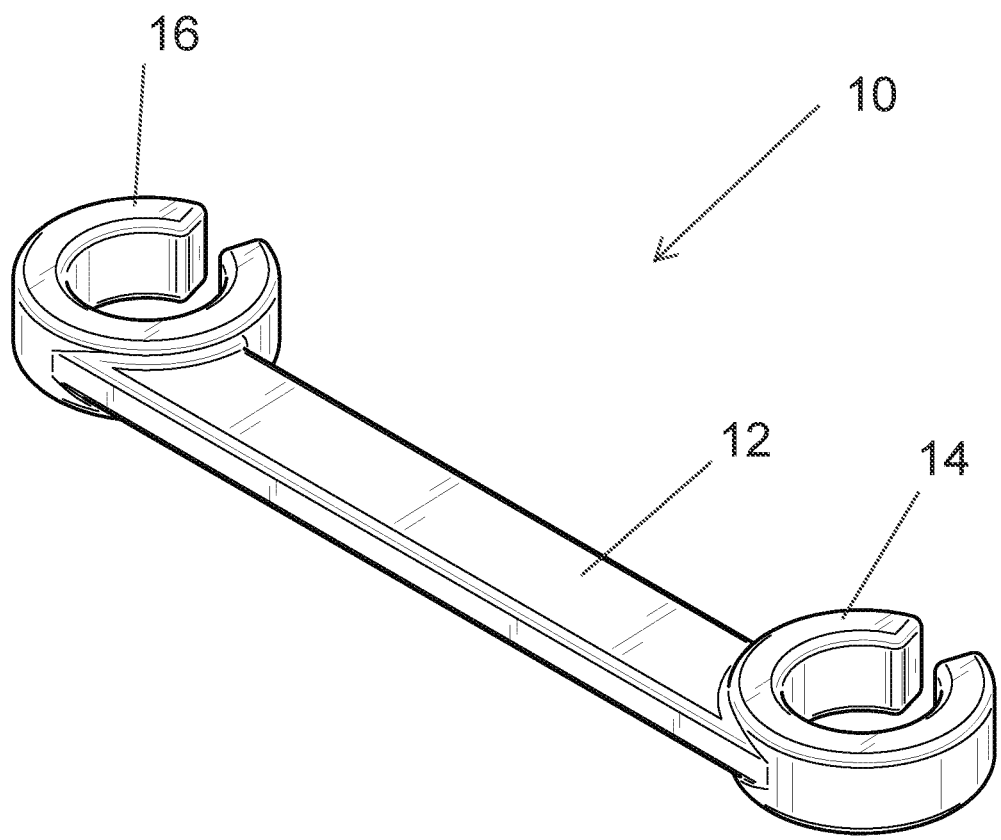
FIG. 1 is a perspective view of the retainer device of the present invention.

As illustrated in FIG. 1, the retainer device 10 includes an elongated body section 12 and two end sections 14, 16 positioned on each end of the body section 12. The body section 12 has a height "A" shown in FIG. 2 and a width "B" shown in FIG. 3. In the exemplary embodiment shown in FIGS. 1-4, the body section 12 has a flattened bar shape with the height A that is larger than the width B. It is understood that the elongated body section can have other suitable shapes, such as, e.g., a rod shape, a square or triangle cross-sectioned bar shape, or a bar shape with a width larger than a height.

The retainer device 10 of the invention is preferably of single-piece construction, which is composed of a single material or blend of materials. Generally, the material used to fabricate the retainer device 10 must have a sufficient structural strength to hold a surgical instrument open, have a resilience so that the retainer device can snap on and off a surgical instrument, be stable to steam sterilization and other common sterilization methods, and desirably is disposable and/or recyclable. Preferably, the materials used for the retainer device 10 can withstand temperatures of about 250 to 300 degrees Fahrenheit during sterilization. In general, the preferred material for retainer device 10 is a polymeric material. Examples of suitable materials include but are not limited to polyurethane, polypropylene, fluoropolymers, polyetherimide, polyether ether ketone (PEEK), and other suitable plastics. In one preferred embodiment, the retainer device is made with polyurethane material. The retainer device 10 of the invention can be manufactured using conventional tool and die equipment, which is readily available in the manufacturing field for molding, cutting and shaping materials. Preferably, the material used for the retainer device 10 is latex free to accommodate users and/or patients that may have an allergy to latex.

The materials used for the retainer device of the invention preferably contain additives that make the material X-ray detectable. Surgery often requires the placement of foreign material inside the human body. Many systems and safeguards are applied in the operating room to ensure that no material is left behind unintentionally after closure. One of such methods is performing an X-ray of the body at and near the surgical site to ensure that no surgical instruments are left inside the body. The X-ray will detect any radiopaque/X-ray detectable foreign materials, which can be removed prior to closing the surgical opening. Thus, using an X-ray detectable material in the retainer device of the invention ensures that the retainer is not accidentally left in a patient's body during surgery. Any of the known suitable radio-opaque biocompatible materials may be used in accordance with the invention, including, for example, barium sulfate, bismuth oxide, bismuth halide, or a halogen-containing plasticizer, diol, or other such halogen-containing material. In some advantageous embodiments, barium sulfate, bismuth oxide, is used.

As shown in FIGS. 1-4, the retainer device 10 has two end sections 14 and 16 positioned on the opposite ends of the body 12. In the embodiment shown in these figures, each end section has a circular shape with a central opening 18. The central opening 18 also has a circular shape, such that, in the preferred embodiment, end sections 14 and 16 form a generally ring-like structure. The central opening 18 is sized so that it can receive a portion of a surgical instrument, such as the ring handles of scissors or forceps. Each end section 14 and 16 has a gap 20 in the ring-like structure whereby the end section can be attached to the portion of a surgical instrument by passing the surgical instrument through the gap 20.

Figure 2:
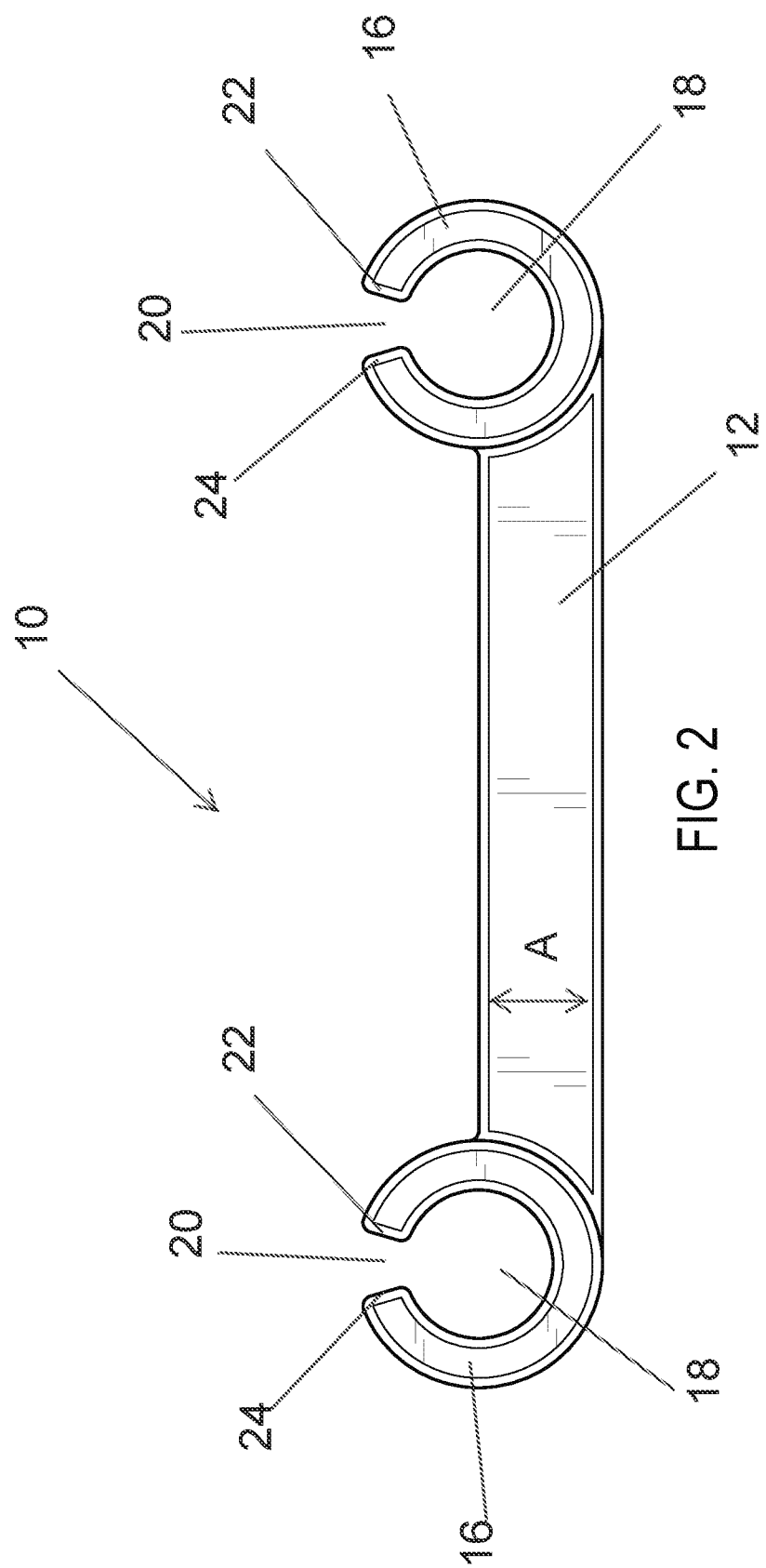
FIG. 2 is a top view of the retainer device of FIG. 1.

As shown in FIG. 2, each of the gaps 20 has a tapered shape that tapers from a larger separation at the outer circumference of the end sections 14 and 16 to a smaller separation at the inner circumference of the end sections 14 and 16, In other words, the gap 20 is wider on top and narrower at bottom. This allows for an easier insertion of portions of surgical instruments into the gap 20 and then into central opening 18 of the end sections 14, 16, with less material resistance.

An outer radius of the end sections 14 and 16 and a radius of the central opening 18 therein are selected such that the end sections 14 and 16 are rigid enough to remain attached to a portion of a surgical instrument but flexible enough to accommodate portions of surgical instruments with varying diameter and outer shapes. In some advantageous embodiments, an outer radius of the end sections 14 and 16 is about 0.1 to about 0.4 inches. In further advantageous embodiments, a radius of the central opening 18 of each end section 14, 16 is about 0.05 to 0.3 inches. In one preferred embodiment, an outer radius of the end sections 14 and 16 is about 0.25 inches and a radius of the central opening 18 of each end section 14, 16 is about 0.15 inches.

An average width of the gap 20 is selected such that gap 20 permits a portion of a surgical instrument to be inserted through the gap 20 into the central opening 18. Preferably, the average width of the gap 20 is the same or slightly smaller than a width or outer diameter of the portion of the surgical instrument inserted therein. This way, the instrument can be securely retained within the retainer device during cleaning/sterilization without falling out of it due to shifting before or during the process. In some advantageous embodiments, the width of the gap 20 is about 0.05 to 0.3 inches. In one preferred embodiment, the width of the gap 20 is around 0.1 inches.

The overall dimensions of the retainer device can vary in accordance with dimensions of specific surgical instruments to be inserted in the device. For example, a length of the elongated body 12 of the retainer device is chosen based on the size and type of surgical instruments.

Figure 5:
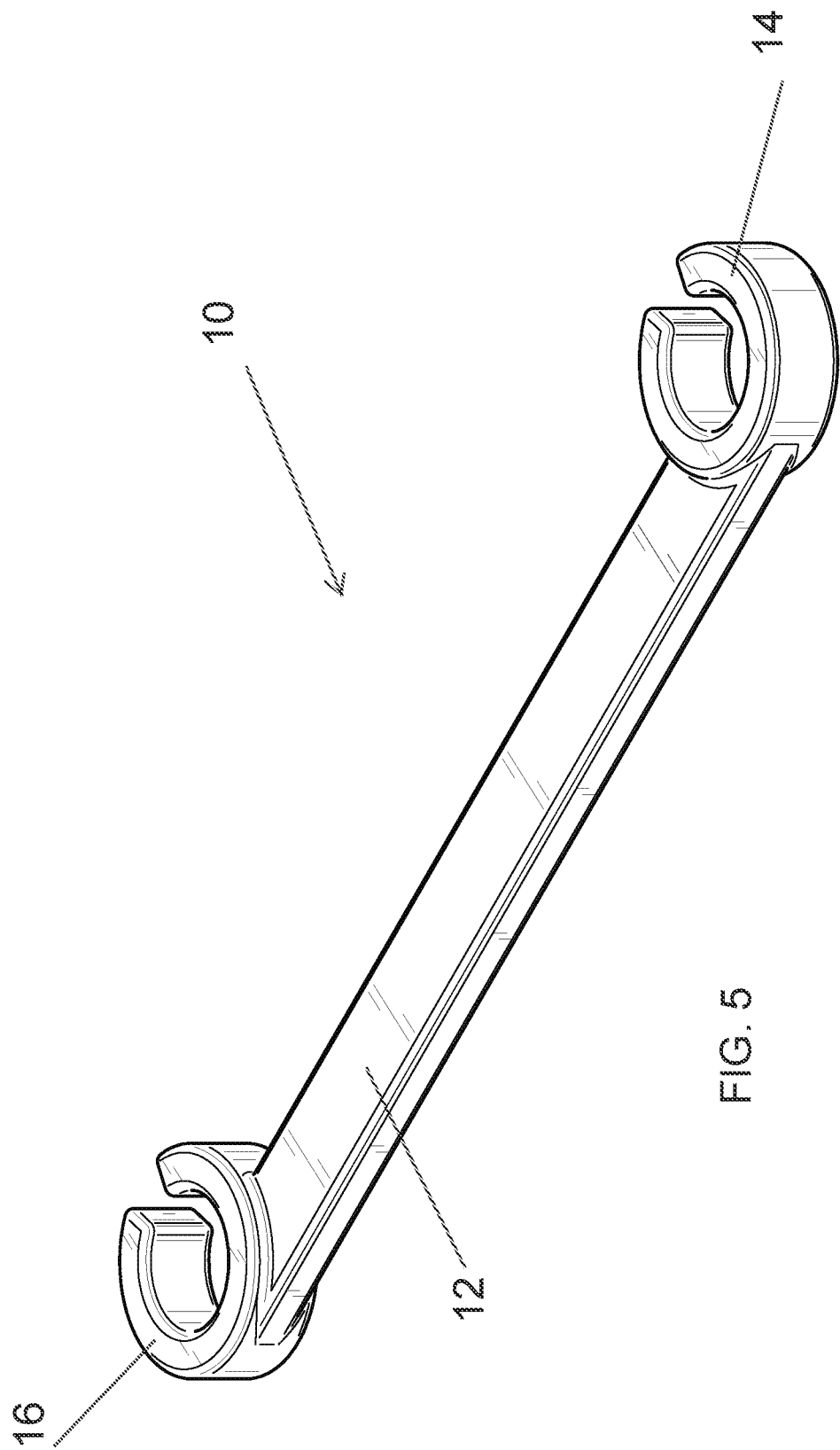
FIG. 5 is a perspective view of another embodiment of the retainer device of the present invention.

There are two general types of surgical instruments that need to be held in open position during cleaning and sterilization—ratcheted instruments and non-ratcheted hinged instruments. Ratcheted instruments, such as clamps, retractors, etc., have a releasable ratchet mechanism that self-locks the instruments in a closed position. Hinged instruments, such as scissors, etc., have a middle hinge that allows articulation of the instrument legs between open and closed positions, typically via ring-handles. Each of these types of instruments also include instruments of different sizes that depend on a type of procedure the instruments are used for. In some preferred embodiments, the length of the elongated body 12 of the retainer device is about 0.5 to 5 inches. In some more preferred embodiments, the length of the elongated body is about 1.5 to 3 inches. In some particularly preferred embodiments, the length of the elongated body is about 1.9 inches, as shown in FIG. 1. In some additional particularly preferred embodiments, the length of the elongated body is about 2.7 inches, as shown in FIG. 5. The height A and the width B of the elongated body 12 of the retainer device can also vary depending on the length and other device characteristics.

Figure 6:
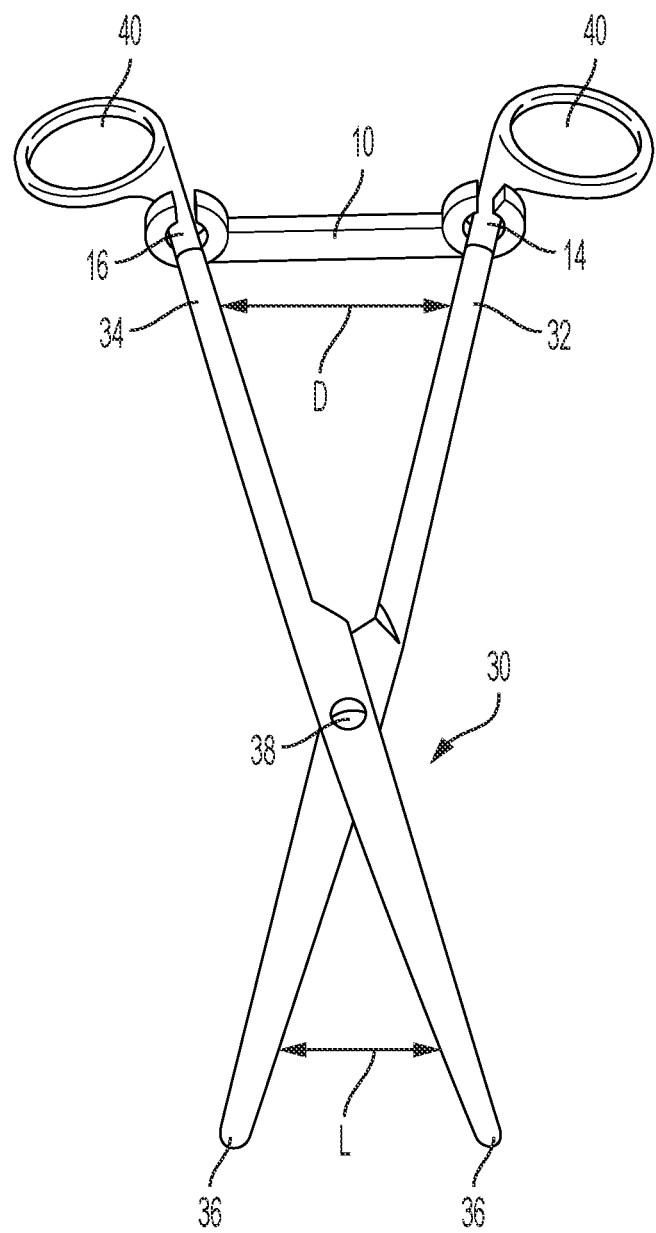
FIG. 6 illustrates the retainer device of FIG. 1, positioned on a surgical instrument, in particular, surgical scissors.

FIG. 6 illustrates the retainer device 10 with a surgical instrument 30, i.e., scissors, inserted therein. The instrument 30 has two movable legs 32 and 34, connected together via a hinge 38. Portions of the legs 32, 34 distal to the hinge terminate with two ring handles 40 and portions of the legs 32, 34 proximal to the hinge form the cutting surfaces or jaws 36. As shown in this figure, the portions of the instrument legs 32, 34 distal to the hinge but proximal to the ring handles 40 are inserted into the central opening 18 of the end sections 14 and 16 of the retainer device to keep the instrument in an opened position such that the jaws 36 are separated and can be properly cleaned and sterilized. The length "D" of the elongated body of the retainer device 10 between the end sections 14, 16 is chosen to achieve the necessary separation distance "C" between the jaws 36 of the instrument.

Figure 8:
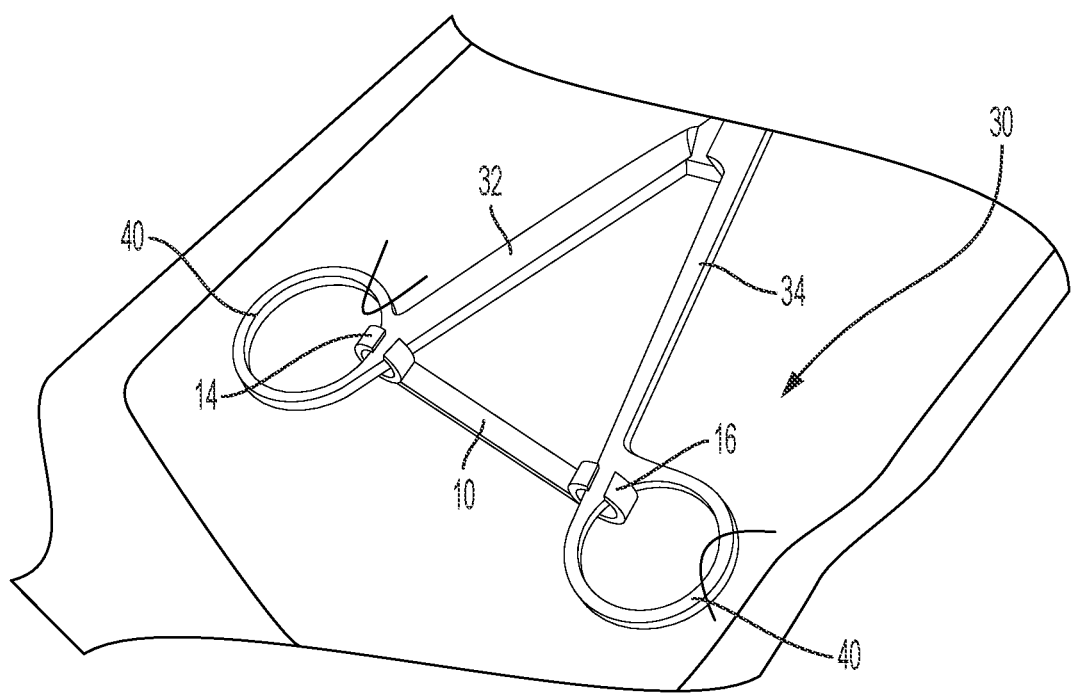
FIG. 8 illustrates another embodiment of a surgical instrument with the retainer device of FIG. 1, placed in a sterilization pouch

Preferably, the end sections 14 and 16 of the retainer device 10 are attached to the ring handles 40 of the surgical instrument 30, as illustrated in FIG. 8. In such case, the end sections 14 and 16 receive portions of the ring handles 40 that are adjacent and facing each other. This positioning of the retainer device achieves the best results in securely retaining the retainer device on the surgical instrument as it prevents the retainer device from shifting or sliding along the movable legs before and/or during cleaning/sterilization.

It is understood that the retainer device 10 may be positioned at various desired locations on the surgical instrument, e.g., along the movable legs or in the ring handles. The length "D" of the retainer device 10 may be selected depending on where the retainer device will be positioned on the surgical instrument.

FIG. 6 illustrates the retainer device 10 with a surgical instrument 30, i.e., scissors, inserted therein. The instrument 30 has two movable legs 32 and 34, connected together via a hinge 38. Portions of the legs 32, 34 distal to the hinge terminate with two ring handles 40 and portions of the legs 32, 34 proximal to the hinge form the cutting surfaces or jaws 36. As shown in this figure, the portions of the instrument legs 32, 34 distal to the hinge but proximal to the ring handles 40 are inserted into the central opening 18 of the end sections 14 and 16 of the retainer device to keep the instrument in an opened position such that the jaws 36 are separated and can be properly cleaned and sterilized. The length "D" of the elongated body of the retainer device 10 between the end sections 14, 16 is chosen to achieve the necessary separation distance "C" between the jaws 36 of the instrument.

Figure 7:
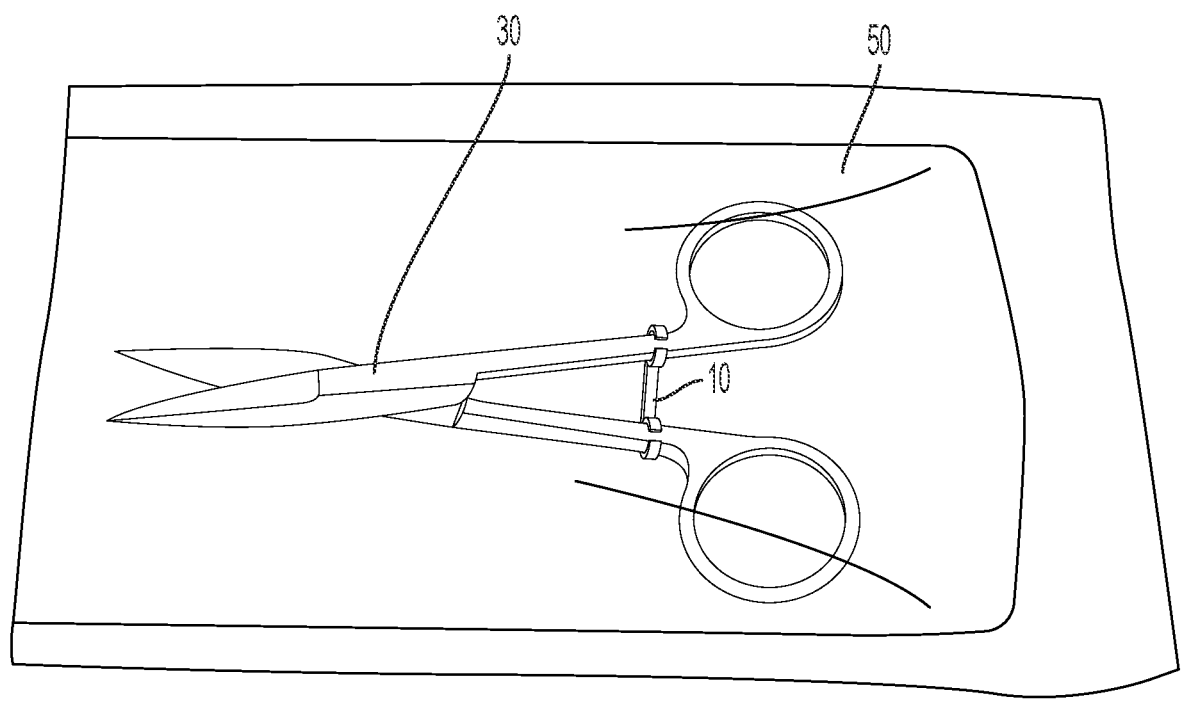
FIG. 7 illustrates a surgical instrument with the retainer device of FIG. 1, placed in a sterilization pouch.

During a cleaning and/or sterilization process, a user will first attach the retainer device 10 to the surgical instrument 30, as shown in FIGS. 6, 7 and 8, to hold the legs 32, 34 in an open position with the legs 32, 34 separated. Next, the user may place the instrument with the retainer device into a cleaning/washing unit and operate the unit to clean off bodily fluids and residue from the instrument. Then, the instrument with the retainer device may be placed in a sterilization container, e.g., a peel pouch, for sterilization.

As shown in FIGS. 7 and 8, the instrument 30 with the retainer device 10 may be placed in a peel pouch 50, the pouch is then sealed and then placed in a sterilization unit and exposed to a desired sterilization method, such as steam or ethylene oxide gas sterilization. Sterilization peel pouches are often placed in the sterilization unit on their side, such that instruments within the pouch are placed in a vertical plane. This causes the instruments to shift under force of gravity such that they are no longer in an opened position. The retainer device 10 of the present invention retains the surgical instrument 30 in an open position within the peel pouch thus ensuring proper cleaning and sterilization.

It is understood that the retainer device of the present invention can be used for keeping surgical instruments open during any type of sterilization process, including for example, dry heat, stead, radiation, and plasma sterilization.

The invention has been described herein above with reference to various and specific techniques and embodiments. It will be understood by one of ordinary skill, however, that reasonable modifications and variations of such embodiments and techniques are possible and can be made without significantly departing from either the spirit or scope of the invention as defined by the claims below.

What is claimed is:

1. A retainer device for positioning surgical instruments for cleaning and sterilization and a surgical instrument, comprising:
   the surgical instrument having two legs hinged together, each having a ring handle at an end thereof;
   the retainer device having;
       an elongated body portion with a first end and a second end, and
       a first end section positioned at said first end and a second end section positioned at said second end, wherein each of said first end section and said second end section comprises a central opening and a gap connected to said central opening; and
       wherein said gap and said central opening are configured to receive a portion of the surgical instrument;
   wherein the retainer device is mounted to the surgical instrument with the end section central openings receiving the ring handles of the surgical instrument.

2. The retainer device and surgical instrument of claim 1, wherein the retainer device is made with material having radio-opaque qualities.

3. The retainer device and surgical instrument of claim 1, wherein the elongated body has a length of about 1 inch to 3.5 inches.

4. The retainer device and surgical instrument of claim 1, wherein the elongated body has a length of about 1.9 inches.

5. The retainer device and surgical instrument of claim 1, wherein the elongated body has a length of about 2.7 inches.

6. The retainer device and surgical instrument of claim 1, wherein said gap has a tapered shape that tapers toward said central opening.

7. The retainer device and surgical instrument of claim 1, further comprising:
   a disposable sterilization package which has at least one gas permeable wall and one transparent wall, wherein the retainer device and surgical instrument are contained in the disposable sterilization package.

8. A retainer device for positioning surgical instruments for cleaning and sterilization and a surgical instrument, comprising:
   the surgical instrument having two legs hinged together, each having a ring handle at an end thereof,
   the retainer device having:
       an elongated body portion with a first end and a second, and a first end section positioned at said first end and a second end section positioned at said second end,
       wherein each of said first end section and said second end section comprises a central opening and a gap connected to said central opening, the ring-like structure having a gap therein, wherein said gap and said central opening are configured to receive a portion of a surgical instrument;
   wherein the retainer device is mounted to the surgical instrument with the end section central openings receiving the ring handles of the surgical instrument.

9. The retainer device and surgical instrument of claim 8, wherein said gap has a tapered shape that tapers toward said central opening.

10. The retainer device and surgical instrument of claim 8, wherein the retainer device is made of a radio-opaque polyurethane material.

11. The retainer device and surgical instrument of claim 8, further comprising:
   a disposable sterilization package which has at least one gas permeable wall and one transparent wall, wherein the retainer device and surgical instrument are contained in the disposable sterilization package.

12. A method of sterilizing a surgical instrument having two legs hinged together, each having a ring handle at an end thereof, comprising the steps of:
   placing the surgical instrument in an open position with the two legs hinged apart,
   positioning the surgical instrument in a retainer device to secure the instrument in the open position, wherein the retainer device comprises:
       an elongated body portion with a first end and a second end, and
       a first end section positioned at said first end and a second end section positioned at said second end, wherein each of said first end section and said second end section comprises a central opening and a gap connected to said central opening, and wherein the step of positioning the surgical instrument in the retainer device comprises inserting one ring handle of the instrument through the gap and into the central opening of the first end section and inserting the other ring handle of the instrument through the gap and into the central opening of the second end section; and placing the surgical instrument with the retainer device in a sterilization container and performing a sterilization process.

13. The method of claim 12, wherein the sterilization container comprises a sterilization peel pouch.

14. The method of claim 12, wherein the retainer device is discarded after the sterilization process.

15. The method of claim 12, wherein the surgical instrument is a ratcheted surgical instrument.

16. The method of claim 12, wherein the gap of the first end section has a width that is substantially the same as an outer diameter of the one ring handle of the instrument, and the gap of the second end section has a width that is substantially the same as an outer diameter of the other ring handle of the instrument.

17. The method of claim 12, wherein the gap of the first end section has a width that is smaller than an outer diameter of the one ring handle of the instrument, and the gap of the second end section has a width that is smaller than an outer diameter of the other ring handle of the instrument.

18. The method of claim 17, wherein the ring handles of the instrument are press fit through the gaps of the first end section and the second end section such that the instrument is securely retained in the retainer device.

\* \* \* \* \*